United States Patent
Nachev et al.

(10) Patent No.: US 8,264,179 B2
(45) Date of Patent: Sep. 11, 2012

(54) METHOD FOR CONTROL OF SYNCHRONOUS ELECTRICAL MOTORS

(76) Inventors: Radek Georgiev Nachev, Varna (BG); Blagovest Georgiev Nachev, Varna (BG)

(*) Notice: Subject to any disclaimer, the term of this patent is extended or adjusted under 35 U.S.C. 154(b) by 341 days.

(21) Appl. No.: 12/670,012

(22) PCT Filed: Jul. 17, 2008

(86) PCT No.: PCT/BG2008/000011
§ 371 (c)(1),
(2), (4) Date: May 3, 2010

(87) PCT Pub. No.: WO2009/012542
PCT Pub. Date: Jan. 29, 2009

(65) Prior Publication Data
US 2012/0098473 A1      Apr. 26, 2012

(30) Foreign Application Priority Data

Jul. 26, 2007    (BG) ...................................... 109922

(51) Int. Cl.
H02P 6/16 (2006.01)
H02P 6/00 (2006.01)
H02P 6/06 (2006.01)
H02P 6/12 (2006.01)

(52) U.S. Cl. ......... 318/400.12; 318/400.01; 318/400.03; 318/400.15; 318/700

(58) Field of Classification Search ............ 318/400.01, 318/400.03, 400.12, 400.15, 700
See application file for complete search history.

(56) References Cited

U.S. PATENT DOCUMENTS

| | | | | |
|---|---|---|---|---|
| 3,617,845 A | * | 11/1971 | McKenna | 388/828 |
| 6,313,600 B1 | * | 11/2001 | Hammond et al. | 318/798 |
| 6,710,562 B1 | * | 3/2004 | Kalb et al. | 318/434 |
| 7,167,348 B2 | * | 1/2007 | Knox et al. | 361/23 |
| 2002/0185926 A1 | * | 12/2002 | King et al. | 310/68 B |
| 2008/0218112 A1 | * | 9/2008 | Beifus et al. | 318/490 |

* cited by examiner

Primary Examiner — Walter Benson
Assistant Examiner — Gabriel Agared

(57) ABSTRACT

Method for control of synchronous electrical motors with application for stepper and Brush-Less Direct Current motors for which there is an explicit relation between the active electrical power supplied to the motor and the mechanical power that the motor delivers to the load. The active electrical power Pel consumed by the motor is measured and according to FIG. 3 the mechanical power Pmech and the maximum available mechanical power Pmech max are determined. The ratio between Pmech and Pmech max is calculated and is compared to the set value of the same ratio. If it is greater than the set one either the operating currents are increased either the operating speed is decreased or both operations are executed. But if it is smaller—either the operating currents are decreased either the operating speed is increased or both operations are executed.

4 Claims, 2 Drawing Sheets

METHOD FOR CONTROL OF SYNCHRONOUS ELECTRICAL MOTORS

I. AREA OF ENGINEERING

Figure 1:
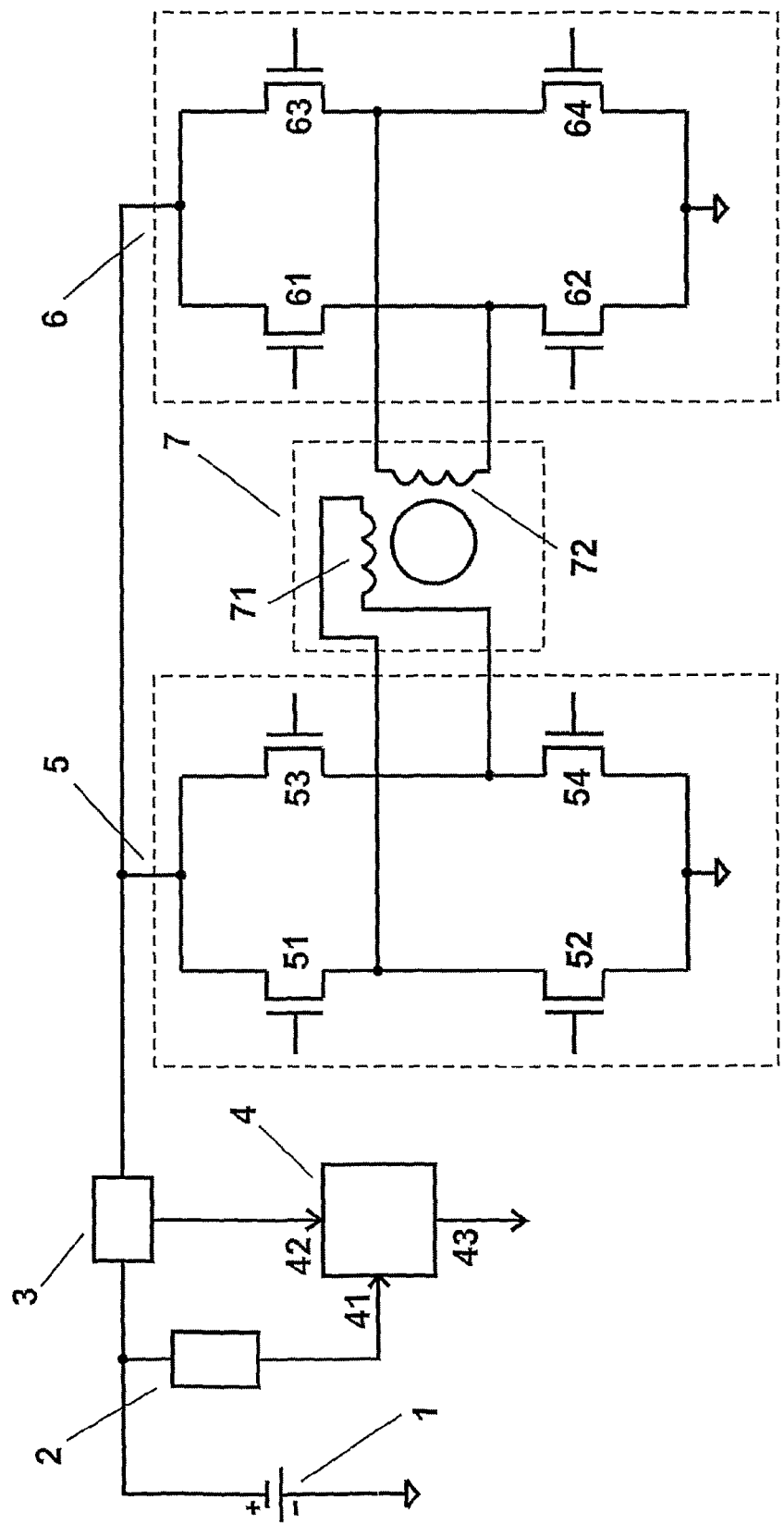

The present invention is related to a method for control of synchronous electrical motors with more specific application to stepper and Brush-Less Direct Current synchronous electrical motors, for which there is an explicit relation between the active electrical power supplied to the motor and the mechanical power delivered by the motor to the load.

II. PRIOR ART IN THE AREA OF ENGINEERING

A method for control of synchronous electrical motors is known where the value of the active electrical power consumed by the motor is in advance set and stored in memory, the value of the active electrical power supplied to the motor at any moment of time is measured, the value of the measured active electrical power is compared with the set value of the same and depending on the measured value being smaller or greater than the set value, the speed of the synchronous motor is respectively increased or decreased. The motor speed is controlled at a maximum while reserving enough power and torque in order that motor stall is avoided. (1)

The shortcomings of the above method for control of synchronous electrical motors are that the control is based on keeping the electrical power supplied to the motor constant instead of keeping the load angle of the motor constant. This may lead to unwanted increasing of the load angle close to 90° where the operation of the motor may become unstable. There is no automatic calibration of the regulating system and it is vulnerable to aging and different random variations. Another shortcoming of the above method is the lack of exact criteria for motor stall detection.

III. TECHNICAL DESCRIPTION OF THE INVENTION

The aim of the invention is to create a method for control of synchronous electrical motors that is reliable, that incorporates automatic calibration preventing the vulnerability due to aging and random variations and that uses exact criteria for motor stall detection.

According to the present invention this aim is accomplished with the method for control of synchronous electrical motors where the active electrical power consumed by the motor is measured at any moment of time during its operation. After motor is switched on, an automatic calibration is performed where the motor is rotated in one direction towards a mechanical stop until the motor stalls; the maximum and minimum values of the consumed active electrical power which are reached while the motor is stalling are measured and stored in memory. The value of the power loss in the motor windings for the operating currents used during the automatic calibration is calculated from the stored maximum and minimum values of the active electrical power and is also stored in memory. The values of the power loss in the motor windings for all other values of the motor operating currents are calculated from the already stored value of the power loss and are also stored in memory. The value of the maximum mechanical power that the motor can deliver to the load for the motor operating currents and the motor operating speed used during the automatic calibration is calculated from the maximum and minimum values of the active electrical power stored during the automatic calibration and is also stored. The values of the maximum mechanical power that the motor can deliver to the load for all other motor operating currents and speeds, are calculated from the already stored value of the same power, and are also stored in memory. The value of the ratio between the mechanical power supplied to the motor and the maximum mechanical power that the motor can deliver to the load is set and stored in memory and the normal operation of the motor and its control begins where the active electrical power supplied to the motor is measured continuously. The current mechanical power supplied to the load is calculated based on the measured current active electrical power consumed by the motor and the stored values of the power loss in the motor windings for the current motor operating currents. After that the current ratio between the current mechanical power delivered to the load and the stored value of the maximum mechanical power that the motor can deliver to the load for the current motor operating currents and speed is calculated. The current ratio is compared with the set and stored value of the same ratio and if it is greater than the stored one the motor operating currents are increased or the motor operating speed is decreased or both operations are carried out; but if the current ratio is smaller that the set one the operating currents are decreased or the operating speed is increased or both operations are carried out. Motor stall is detected with monitoring the active electrical power consumed by the motor which at the moment of stall initially increases to a maximum and/or after that abruptly decreases to a minimum.

Another criterion that can be used to detect motor stall is when the ratio between the current mechanical power delivered to the load and the maximum mechanical power that the motor can deliver to the load for the current motor operating currents and motor operating speed becomes greater than a coefficient $k_H$, which is close to one and less than one.

Another criterion that can be used to detect motor stall is when the ratio between the current mechanical power delivered to the load and the maximum mechanical power that the motor can deliver to the load for the current motor operating currents and motor operating speed becomes lower than a coefficient $k_L$, which is close to zero and greater than zero.

Another criterion that can be used to detect motor stall is when the ratio between the current active electrical power consumed by the motor and the power loss in the motor windings for the current motor operating currents becomes lower than a coefficient $k_{Lel}$, which is close to one and greater than one.

The advantages of the present method for control of synchronous electrical motors are that it maintains constant the motor load angle; both the motor operating speed and the motor operating currents are regulated thus using all degrees of freedom in the system during the regulation; it is possible to use automatic calibration at any time which allows to eliminate the vulnerability to the aging and the random variations that can occur in the system; it uses exact criteria for motor stall detection.

IV. EXPLANATION OF THE REFERENCED FIGURES

Figure 2:
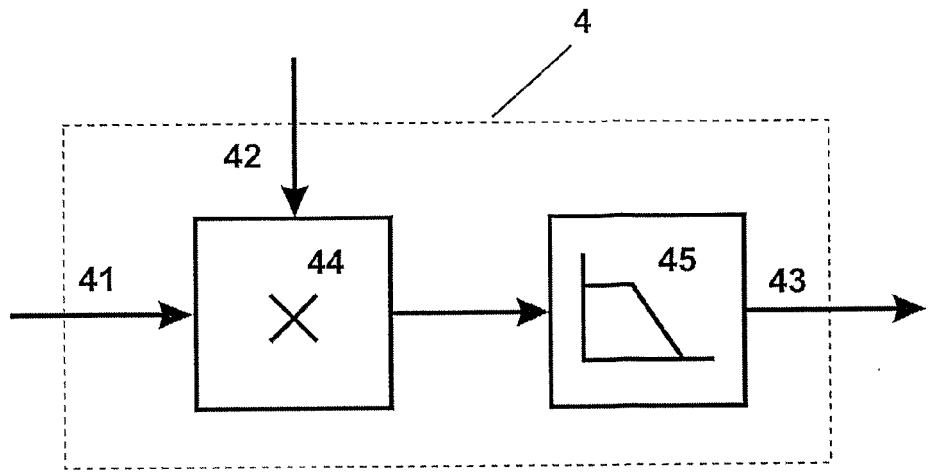

The invention is explained in more details with the help of the exemplary embodiment of a device for control of synchronous electrical motors which is implemented in accordance with the present method, where:

On FIG. 1 the principal block diagram of the device is given;

On FIG. 2 the block for measurement of the active power is shown and

Figure 3:
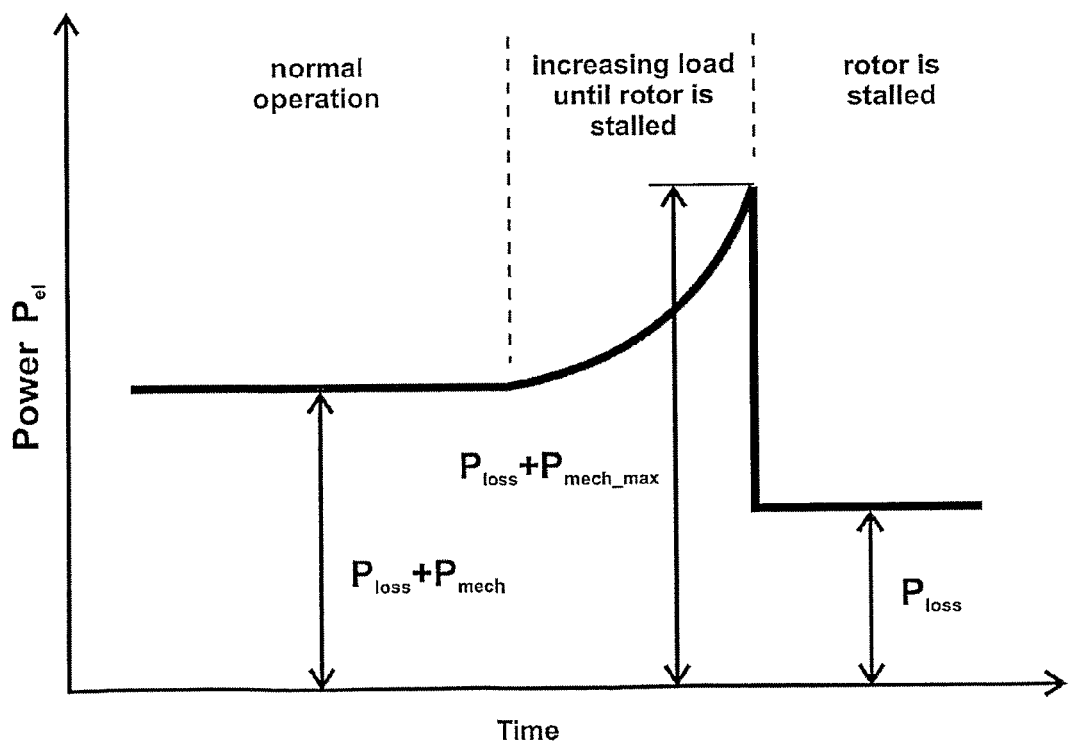

On FIG. 3 the waveform of the active electrical power consumed by a stepper motor during stall is shown.

V. EXEMPLARY EMBODIMENT OF THE INVENTION

As shown on FIG. 1 the device for control of a stepper motor consists of a supply source 1 which through the H-bridges 5 and 6, each consisting of four switches 51, 52, 53, 54 and 61, 62, 63, 64 respectively, supplies currents in the motor windings 71 and 72 of the stepper motor 7. The measurement block 2 measures the voltage of the supply source and the measurement block 3 measures the total current that is drawn by the motor. These voltage and total current are supplied to the inputs 41 and 42 of block 4. Block 4 calculates the active power drawn by the motor and outputs it to its output 43. The principle schematic of block 4 is given on FIG. 2. In block 4 the active electrical power drawn by the motor is calculated by multiplying the voltage and the total current with the multiplier 44 and the resulting product is filtered with the low-pass filter 45. Any active power meter can substitute the blocks 2, 3 and 4. The value of the active power drawn by the motor is supplied to the controlling unit 8 which controls the motor trough its outputs 81.

In order to control the motor according to the present method it is necessary to continuously measure the active electrical power drawn by the motor. This power is measured by measuring the voltage and the total current supplied to the motor and then multiplying these voltage and current to obtain the momentary electrical power supplied to the motor. The momentary electrical power is then filtered with the low-pass filter obtaining its average value which is the active electrical power supplied to the motor.

On FIG. 1 there are two H-bridges 5 and 6 each one consisting of four switches. The H-bridges, as it is commonly known, enable driving bidirectional currents trough the windings of the stepper motor and thus generate the rotating magnetic field of the motor stator. The rotating stator magnetic field drags the magnetic rotor with itself creating the movement of the rotor. The H-bridges also enable controlling the currents of the windings with Pulse Width Modulation. For example, when switches 51 and 54 of H-bridge 5 are closed, winding 71 is connected to the supply source 1 and the current trough it increases. When in the next moment switches 52 and 54 are closed, the winding is short-circuited and the current trough it decreases. By altering the close and open switches the current trough this winding can be regulated to follow a given set value. The same is also valid for winding 72 of the motor. This way the currents in the windings are regulated with Pulse Width Modulation, where the Pulse Width Modulation modulates the duration of the closing and opening of the H-bridges' switches. In order to generate rotating magnetic field, the set values for the currents in the motor windings are chosen to resemble sinusoidal waveforms in time which in the case of two-phase motors have to be phase-shifted with 90 degrees.

On FIG. 3 the waveform in time of the active electrical power $P_{el}$ supplied to the motor in three regimes of operation is shown:
a) normal operation;
b) operation with increasing load until the rotor is stalled;
c) operation with stalled rotor;

In normal operation the motor runs with constant speed and constant load and consumes constant active electrical power $P_{el}$ which is equal to the sum of the mechanical power $P_{mech}$ delivered to the load and the power loss $P_{loss}$ in the stator windings of the motor. When operating with increasing load the active electrical power $P_{el}$ is increasing because the mechanical power delivered to the load is increasing. When reaching the maximum torque that the motor can exert on the load, the maximum mechanical power $P_{mech\_max}$ that can be delivered to the load is reached. After that the synchronous rotation of the rotor with the stator magnetic field is no longer possible and the rotor stalls. The mechanical power $P_{mech}$ delivered to the load reduces to zero and the active electrical power $P_{el}$ supplied to the motor becomes equal to the power loss $P_{loss}$ in the stator.

When it is known that the voltage of the supply source is constant, the measurement of the active electrical power can be substituted with measurement of the average value of the total current supplied to the motor. In this case the average value of the total current supplied to the motor serves as a measure of the active electrical power supplied to the motor.

The active electrical power supplied to the motor can be expressed with the following formula:

$$P_{el} = P_{mech} + P_{loss} \quad (1)$$

where $P_{el}$ is the active electrical power supplied to the motor, $P_{mech}$ is the mechanical power delivered to the load and $P_{loss}$ is the power loss in the stator windings. The active electrical power supplied to the motor $P_{el}$ is determined by measurements, the other two variables $P_{mech}$ and $P_{loss}$ in this equation are unknown. If we have one more equation connecting the variables $P_{el}$, $P_{mech}$ and $P_{loss}$ we can determine all unknown variables. In general the method of the present invention can be used for all synchronous motors where, having the active electrical power supplied to the motor $P_{el}$, we can determine the mechanical power delivered to the load $P_{mech}$.

Let us apply the method of the present invention to the case of stepper motor for which the currents trough its stator windings are regulated with Pulse Width Modulation. Since these currents are regulated with Pulse Width Modulation they vary very little with the load change and this variation can be neglected. Their shape and magnitude are known and the power loss in the stator windings can be easily calculated. For example, the following formula can be used:

$$P_{loss} = k_I R I_m^2 \quad (2)$$

where $P_{loss}$ is the power loss in the stator windings, $I_m$ is the maximum value of the stator currents, $k_I$ is a coefficient that depends on the shape of the currents and R is the sum of the resistance of the stator windings. Depending on the shape of the currents the power loss $P_{loss}$ may depend with a more complex formula on the stator currents. In these cases the correct formula has to be derived and the power loss has to be determined.

Once the power loss $P_{loss}$ is determined the mechanical power delivered to the load can be calculated:

$$P_{mech} = P_{el} - P_{loss} \quad (3)$$

In addition to the mechanical power $P_{mech}$ delivered to the load, one more variable has to be determined in order to apply the present method. This variable is the maximum mechanical power that the motor can deliver to the load $P_{mech\_max}$. In principle the mechanical power that the motor delivers to the load is given with the following formulas:

$$P_{mech} = M\omega$$

$$M = k_M I_m \sin\theta \quad (4)$$

where $P_{mech}$ is the mechanical power delivered to the load, M is the torque of the motor, $\omega$ is the angular speed of the rotor, $I_m$ is the maximum value of the stator currents, $\theta$ is the load angle and $\kappa_m$ is a coefficient that depends on the motor. The load angle $\theta$ is defined as the angle with which the rotor magnetic field lags behind the stator magnetic field while rotating synchronously with it. The maximum value of the mechanical power that the motor can deliver to the load, for a given speed, is reached when the load angle becomes 90 degrees. Then the torque that the motor exerts on the load reaches its maximum and the mechanical power delivered to the load also reaches its maximum according to the following formulas:

$$P_{mech\_max} = M_{max}\omega$$

$$M_{max} = k_M I_m \sin 90° = k_M I_m \quad (5)$$

where $P_{mech\_max}$ is the maximum mechanical power that the motor can deliver to the load for the given currents in the stator windings and the given speed of rotation, $M_{max}$ is the maximum torque that the motor can exert on the load for the given currents in the stator windings. The value of $M_{max}$ for the nominal value of the currents in the stator windings is usually given in the datasheet of the motor and is called "holding" torque. Knowing the maximum torque $M_{max}$ and the rotation speed $\omega$, from (5), the maximum mechanical power $P_{mech\_max}$ for the given currents and speed can be determined.

Knowing the current mechanical power $P_{mech}$ delivered to the load and the maximum mechanical power $P_{mech\_max}$ that the motor can deliver to the load for the current speed and stator currents it is possible to determine the load angle with the following formulas:

$$\sin\theta = \frac{M}{M_{max}} = \frac{P_{mech}}{P_{mech\_max}} \quad (6)$$

$$\theta = \arcsin\left(\frac{P_{mech}}{P_{mech\_max}}\right)$$

Formulas (5) show that in order to control the motor keeping constant the load angle $\theta$ it is necessary to keep constant the ratio between $P_{mech}$ and $P_{mech\_max}$ for the current speed and stator currents. If the load angle increases the speed of rotation can be decreased. This will lead to decrease of the viscous friction and decrease of the motor loading and consequently to a decrease of the load angle. It is also possible to increase the stator currents of the motor. This will lead to an increase of the maximum motor torque $M_{max}$ and consequently to a decrease of the load angle. The two operations of decreasing the rotation speed and increasing, the stator currents can be done simultaneously, they both will lead to decreasing the load angle and restoring back its desired value. Respectively, if the load angle decreases, it is possible either to increase the rotation speed or to decrease the stator currents or to execute both operations simultaneously in order to increase the load angle and restore it back to its desired value. With these operations the load angle can be kept constant, equal to a predetermined optimal value and independent of the motor loading.

One of the main advantages of the present method is that the load angle of the motor is monitored and optimal operation of the motor is maintained regardless of the motor loading. The load angle is kept constant, equal to a predetermined optimal value, far from the regions of operation with very low or high load angle. When the motor operates with low load angle its operation is not efficient—since the stator currents are very high for the small load, a lot of electrical energy is wasted as heat in the stator windings and the efficiency is low. When the motor operates with high load angle its torque is close to its maximum and its operation is insecure because every small load disturbance can lead to loss of synchronism and stall.

Another advantage of the present method is that it uses all degrees of freedom for the motor control. The load angle can be controlled with change of either the rotation speed or the stator currents or both.

Determining the Power Loss $P_{loss}$

In order to determine the two variables necessary for implementation of the present method—the mechanical power $P_{mech}$ delivered to the load and the maximum mechanical power that the motor can deliver to the load $P_{mech\_max}$, it is necessary to determine the power loss in the stator windings $P_{loss}$. The power loss can be determined in several ways.

It can be determined analytically using formula (2). In this case the coefficient $k_I$ has to be known. This coefficient can be derived analytically because it depends on the shape of the currents in the stator windings. For example for sinusoidal currents in the stator windings the coefficient $k_I$ is equal to 0.5. The sum of the resistance of the stator windings R can be found in the datasheet of the motor. The amplitude $I_m$ of the stator currents is also known.

The power loss $P_{loss}$ can be determined experimentally also. One way for experimentally determining $P_{loss}$ is to block the rotation of the motor, drive the normal operation currents in the stator windings and measure the active electrical power $P_{el}$ supplied to the motor. The active electrical power in this case will be equal to the power loss $P_{loss}$, since the rotor is not moving and the mechanical power $P_{mech}$ delivered to the load is zero.

Another way for experimentally determining $P_{loss}$ is to drive in the stator windings currents that do not create rotating magnetic field. It is known for example that two sinusoidal currents phase-shifted with 90 degrees produce rotating magnetic field. But if there is no phase-shift between them they produce pulsating magnetic field which in general will not bring the rotor in rotation. If the frequency of these currents is much higher than the frequency that the rotor with its inertia can follow, the rotor will stay still. In this case again the mechanical power $P_{mech}$ delivered to the load will be zero and the active electrical power $P_{el}$ supplied to the motor will be equal to the power loss $P_{loss}$. The power loss in the stator windings does not depend on whether the two currents are phase-shifted or not so if their amplitude is the same as in normal operation, the power loss will also be the same as in normal operation. In this case again with measuring the active electrical power supplied to the motor, the power loss $P_{loss}$ can be determined.

Another variant for experimentally determining the power loss in the stator windings is to drive constant currents trough the stator windings. The constant currents will create a constant magnetic field, the rotor will align itself with this field and will stand still. Again the mechanical power delivered to the load is zero and the active electrical power supplied to the motor is equal to the power loss in the stator windings. If the value of the constant currents is equal to the amplitude $I_m$ of the currents in normal operation, the measured power loss with constant currents will be twice bigger that the power loss in normal operation. From this the power loss $P_{loss}$ in normal operation can be determined.

The power loss $P_{loss}$ has to be determined for all values of the currents in the stator windings. This can be done by experimentally determining $P_{loss}$ for one value of the currents and recalculating $P_{loss}$ for all other values of the currents using the following formula:

$$\frac{P_{loss1}}{P_{loss2}} = \left(\frac{I_{m1}}{I_{m2}}\right)^2 \qquad (7)$$

where $P_{loss1}$ and $P_{loss2}$ are the power losses for two different operating currents in the stator windings, $I_{m1}$ and $I_{m2}$ are the maximum values of the two different operating currents. Here the proportionality given in (2) of the power loss to the square value of the maximum of the currents is used. For more complex shapes of the currents the power loss may depend in a more complex manner on the currents. In general if the power loss for one or several values of the stator currents is known, the power loss for every other value of the stator currents can be determined according to the above principle.

Following the above it is possible to implement automatic calibration of the values of the power loss $P_{loss}$ each time the motor is switched in operation. After switching in operation the power loss $P_{loss}$ for one or more values of the stator currents can be determined using one of the ways for experimental determining of the power loss described above. After that the power loss for all other values of the stator currents can be recalculated based on the measured values of the power loss and formula (7).

The automatic calibration is one major advantage of the present method because it eliminates the errors caused by motor parameters degradation that can reduce the accuracy and efficiency of the motor control.

Determining the Maximum Mechanical Power $P_{mech\_max}$ the Motor can Deliver to the Load.

The maximum mechanical power $P_{mech\_max}$ that the motor can deliver to the load can be determined analytically using formula (5). The value of the maximum torque $M_{max}$ that the motor can exert on the load for the nominal value of the stator currents can be found from the datasheet of the motor. The maximum mechanical power $P_{mech\_max}$ is determined for the respective angular speed $\omega$ of the motor. For other values of the stator currents and the rotation speed, $P_{mech\_max}$ can be determined using the following formulas:

$$\frac{P_{mech\_max1}}{P_{mech\_max2}} = \frac{M_{max1}}{M_{max2}} = \frac{I_{m1}}{I_{m2}} \qquad (8)$$

where $P_{mech\_max1}$ and $P_{mech\_max2}$ are the values of the maximum mechanical power that the motor can deliver to the load for two different values $I_{m1}$ and $I_{m2}$ of the stator currents for one and the same rotation speed $\omega$, and:

$$\frac{P_{mech\_max1}}{P_{mech\_max2}} = \frac{\omega_1}{\omega_2} \qquad (9)$$

where $P_{mech\_max1}$ and $P_{mech\_max2}$ are the values of the maximum mechanical power that the motor can deliver to the load for two different values $\omega_1$ and $\omega_2$ of the rotation speed for one and the same value and shape of the stator currents.

The maximum mechanical power $P_{mech\_max}$ that the motor can deliver to the load can be determined experimentally also. One possible way for measuring this power is to drive the motor with constant speed and load it gradually until it loses synchronism with the stator magnetic field. At the moment before losing synchronism the motor delivers its maximum mechanical power $P_{mech\_max}$ to the load. At this moment it is possible to measure the active electrical power $P_{el}$ supplied to the motor. This power according to (1) is equal to the sum of the maximum mechanical power $P_{mech\_max}$ that can be delivered to the load for the current rotation speed and the power loss $P_{loss}$ in the stator windings. The power loss $P_{loss}$ was determined already above. With subtraction of $P_{loss}$ from the measured $P_{el}$ it is possible to determine the maximum mechanical power $P_{mech\_max}$ that the motor can deliver to the load for the current rotation speed and stator currents.

Automatic Calibration

For maintaining good accuracy and efficiency of the motor control, periodic automatic calibration of the values of the power loss $P_{loss}$ and the maximum mechanical power $P_{mech\_max}$ can be executed.

When using stepper motors in a positioning system it is common that after each switching on of the system an initialization run is performed. The initialization run is done by rotating the motor in one direction until a mechanical stop located at the end of the run is reached. When the motor reaches the mechanical stop it stalls. This stall is detected and the motor is stopped. The position of the motor at the stop is taken as the zero position and all subsequent movements are made relative to this position.

The same initialization run can be used for automatic calibration in the present method. On FIG. 3 the waveform of the active electrical power supplied to the motor for the initialization run is given. The normal operation region far from the mechanical stop is shown. In this region the active electrical power $P_{el}$ supplied to the motor is equal to the sum of the power loss $P_{loss}$ and the mechanical power $P_{mech}$ delivered to the load. When the motor enters into the zone of the mechanical stop, the counter-torque and the motor loading start to increase. The mechanical power delivered to the load also increases until the maximum mechanical power $P_{mech\_max}$ is reached. After stator magnetic field ceases and the motor stalls. When the motor is stalled the mechanical power $P_{mech}$ delivered to the load becomes zero and the active electrical power $P_{el}$ supplied to the motor becomes equal to the power loss $P_{loss}$.

During this initialization run the value of the active electrical power $P_{el\_max}$ supplied to the motor at the moment when the motor delivers its maximum mechanical power can be stored:

$$P_{el\_max} = P_{mech\_max} + P_{loss} \qquad (10)$$

Also the value of the active electrical power supplied to the motor when the motor is stalled can be stored:

$$P_{el\_min} = P_{loss} \qquad (11)$$

From (10) and (11) the maximum mechanical power $P_{mech\_max}$ and the power loss $P_{loss}$, can be easily found.

For more precise measurements of the maximum mechanical power $P_{mech\_max}$ the process of motor stalling can be slowed down by using a lower rotation speed. Also the mechanical stop can be covered with elastic materials in order to smooth down the stalling.

For more precise measurements of the power loss $P_{loss}$, after detecting the abrupt decrease of the active electrical power $P_{el}$ occurring at the moment of stall, the rotation speed can be increased. Because of the non-zero inertia of the rotor, the higher rotation speed will eliminate possible mechanical vibrations of the rotor at the stop position. This will eliminate possible mechanical power adding to the power loss $P_{loss}$ and appearing in the active electrical power $P_{el}$ measured at that time.

Motor Stall Detection.

According to FIG. 3 and the above, motor stall can be detected by monitoring the active electrical power $P_{el}$ supplied to the motor. When the motor stalls the active electrical power $P_{el}$ first reaches a maximum equal to the sum of the power loss $P_{loss}$ and the maximum mechanical power $P_{mech\_max}$ that the motor can deliver to the load. After that the active electrical power $P_{el}$ drops abruptly to the value of the power loss $P_{loss}$.

This characteristic shape of the waveform of the active electrical power $P_{el}$ during motor stall when $P_{el}$ first reaches a maximum and after that drops abruptly to a minimum can be used whenever the values of the maximum mechanical power $P_{mech\_max}$ and the power loss $P_{loss}$ are not known beforehand. This happens for example during an automatic calibration when these variables are measured.

When the values of $P_{mech\_max}$ and $P_{loss}$ are already known, which happens after the automatic calibration the stall detection of the motor can be done by one of the following ways.

Stall is detected if the mechanical power $P_{mech}$ delivered to the load becomes greater than the value $P_{mechH}$:

$$P_{mechH} = k_H P_{mech\_max} \quad (12)$$

where $k_H$ is a coefficient close to, but less than 1 and that is chosen depending on the application. For example for a given application $k_H$ can be equal to 0.97.

Stall is detected if the mechanical power $P_{mech}$ delivered to the load becomes lower than the value $P_{mechL}$:

$$P_{mechL} = k_L P_{mech\_max} \quad (13)$$

where $k_L$ is a coefficient close to, but greater than 0 and that is chosen depending on the application. For example for a given application $k_L$ can be equal to 0.03. Analogous to this criterion of stall is to have the active electrical power $P_{el}$ supplied to the motor drop below the value $P_{elL}$:

$$P_{elL} = k_{Lel} P_{loss} \quad (14)$$

where $k_{Lel}$ is a coefficient close to, but greater than 1 and that is chosen depending on the application. For example for a given application $k_{Lel}$ can be equal to 1.03.

Stall is detected if either of the above two conditions are detected—the mechanical power $P_{mech}$ delivered to the load becomes greater than $P_{mechH}$ or the mechanical power $P_{mech}$ becomes lower than $P_{mechL}$.

Description of the Operations of the Method for Motor Control:

The present method for motor control is described with the following successive operations:
- determining and storing the values of the power loss $P_{loss}$ in the motor for all values of the operating currents of the motor;
- determining and storing the values of the maximum mechanical power $P_{mech\_max}$ that the motor can deliver to the load for all values of the operating currents and rotation speed of the motor;
- choosing and storing a set value for the ratio between the current mechanical power $P_{mech}$ delivered to the load and the maximum mechanical power $P_{mech\_max}$ that the motor can deliver to the load—$P_{mech}/P_{mech\_max}$. It means that a set value for the load angle θ is chosen and the motor will be controlled to keep its load angle equal to this value;
- measuring the current value of the active electrical power $P_{el}$ supplied to the motor;
- calculating the current mechanical power $P_{mech}$ that the motor delivers to the load using formula (1);
- calculating the current ratio between the mechanical power $P_{mech}$ delivered to the load and the maximum mechanical power $P_{mech\_max}$ that the motor can deliver to the load—$P_{mech}/P_{mech\_max}$;
- comparing the current ratio $P_{mech}/P_{mech\_max}$ with its set value and controlling the motor. If the current ratio $P_{mech}/P_{mech\_max}$ is greater than the set one either the operating currents of the motor have to be increased or the rotation speed has to be decreased or both can be done simultaneously. If the current ratio $P_{mech}/P_{mech\_max}$ is lower than the set one either the operating currents of the motor have to be decreased or the rotation speed has to be increased or both can be done simultaneously.

Description of the Operations for Automatic Calibration:

The automatic calibration in the present method is used in order to determine the variables necessary for the method implementation—the power loss $P_{loss}$ in the motor and the maximum mechanical power $P_{mech\_max}$ that the motor can deliver to the load. The automatic calibration also serves for periodical refreshing of these variables in order to keep the accuracy and the efficiency of the method.

The automatic calibration is described with the following successive operations:
- the motor rotor is rotated in one direction until the mechanical stop is reached. During this movement appropriate rotation speeds for accurately measuring $P_{loss}$ and $P_{mech\_max}$ are used;
- monitoring the active electrical power $P_{el}$ supplied to the motor for the characteristic shape of the waveform when during stall $P_{el}$ first rises to a maximum $P_{el\_max}$ and after that abruptly falls to a minimum $P_{el\_min}$. Calculating $P_{loss}$ and $P_{mech\_max}$ using formulas (10) and (11) for the operating currents and the rotation speed used during the automatic calibration.
- determining $P_{loss}$ and $P_{mech\_max}$ for all other values of the operating currents and rotation speed using (7), (8) and (9);

Stall Detection Procedure:

Stall is detected by the following criteria:
- the waveform of the active electrical power $P_{el}$ supplied to the motor has the characteristic shape of first rising to a maximum $P_{el\_max}$ and after that abruptly falling to a minimum $P_{el\_min}$. In special cases it is possible that the shape of the waveform of $P_{el}$ does not follow strictly first rising to maximum and than falling to minimum. In these cases an abrupt change only in the waveform of $P_{el}$ has to be used as criterion for stall.
- the ratio between the current mechanical power $P_{mech}$ delivered to the load and the maximum mechanical power $P_{mech\_max}$ that the motor can deliver to the load—$P_{mech}/P_{mech\_max}$ becomes greater than $k_H$;
- the ratio between the current mechanical power $P_{mech}$ delivered to the load and the maximum mechanical power $P_{mech\_max}$ that the motor can deliver to the load—$P_{mech}/P_{mech\_max}$ becomes lower than $k_L$. Analogous is that the ratio between the active electrical power $P_{el}$ supplied to the motor and the power loss $P_{loss}$ in the motor—$P_{el}/P_{loss}$ becomes lower than $k_{Lel}$.

VI. APPLICATION OF THE INVENTION

The present invention can be applied to all synchronous electrical motors for which the currents trough their windings are controlled with Pulse-Width Modulation. The Pulse-Width Modulation control switches on or off certain switching elements that supply the motor windings with supply voltage or short-circuit them. This way the current trough a given winding either increases or decreases depending on that whether the supply voltage is switched to the winding or the winding is short-circuited. The increase and the decrease of the current are controlled so that the current in the given winding is almost equal to a given set value. Motors that use Pulse-Width Modulation control of the currents in their windings are the stepper motors, the Brush-Less Direct Current motors and etc.

The method described in the current invention is applicable also to all synchronous motors for which from the active electrical power $P_{el}$ consumed by the motor it is possible to explicitly determine the mechanical power $P_{mech}$ that the motor delivers to the load at any moment of time.

REFERENCES USED

1. Patent application WO 03/100960, published on Apr. 12, 2004

The invention claimed is:

1. Method for control of synchronous electrical motors for which the current active electrical power consumed by the motor at any moment of time during operation is measured, characterized with this, that after switching the motor in operation, an automatic calibration is performed, where the motor is driven in one direction towards stall and the reached maximum and minimum values of the consumed by the motor active electrical power are measured and stored in memory;

the power loss in the motor windings for the operating currents used during the automatic calibration is calculated from the stored maximum and minimum values of the active electrical power and is also stored in memory;

the values of the power loss in the motor windings for all other operating currents are calculated from the initially calculated value of the same power for the operating currents used during the automatic calibration and are also stored in memory;

the maximum mechanical power that the motor can deliver to the load for the used during the automatic calibration operating currents and speed of rotation is calculated from the stored during the automatic calibration maximum and minimum values of the active electrical power and is also stored in memory;

the values of the maximum mechanical power that the motor can deliver to the load for all other values of the operating currents and speed of rotation are calculated from the already calculated value of the same power for the operating currents and speed of rotation during automatic calibration and are also stored in memory;

the value of the ratio between the current mechanical power delivered to the load and the maximum mechanical power that the motor can deliver to the load is set and stored in memory and after that the normal operation and control of the motor begins, where the current active electrical power consumed by the motor at any moment of time is measured;

the current mechanical power delivered to the load is calculated using the measured current value of the active electrical power and the stored values of the power loss for the current operating currents;

the current ratio between the current mechanical power and the stored maximum mechanical power for the current operating currents and speed of rotation is calculated;

the current ratio is compared with the set and stored value of the same ratio and if it is greater than the stored ratio either the motor operating currents are increased either the speed of rotation is decreased or both operations are executed, but if the current ratio is smaller than the stored one either the motor operating currents are decreased, either the speed of rotation is increased or both operations are executed;

motor stall is detected with monitoring the consumed by the motor active electrical power where at the moment of stall an increase to a maximum of the active electrical power is detected and/or a subsequent abrupt decrease of this power to a minimum is detected.

2. Method according to claim 1, characterized with this, that motor stall is detected when the ratio between the current mechanical power that is delivered to the load and the maximum mechanical power that the motor can deliver to the load for the current operating currents and speed of rotation becomes greater than the coefficient $k_H$ which is close to one and less than one.

3. Method according to claim 1, characterized with this, that motor stall is detected when the ratio between the current mechanical power that is delivered to the load and the maximum mechanical power that the motor can deliver to the load for the current operating currents and speed of rotation becomes smaller than the coefficient $k_L$ which is close to zero and greater than zero.

4. Method according to claim 1 and claim 3, characterized with this, that motor stall is detected when the ratio between the current active electrical power consumed by the motor and the power loss in the motor windings for the current motor operating currents becomes smaller than the coefficient $K_{Lel}$ which is close to one and greater than one.

* * * * *